Dec. 5, 1933.   H. A. TOMKINS   1,938,409
CHUCK
Filed Aug. 29, 1932

INVENTOR
Harold A. Tomkins
BY Chappell & Earl
ATTORNEYS

Patented Dec. 5, 1933

1,938,409

UNITED STATES PATENT OFFICE 1,938,409

CHUCK

Harold A. Tomkins, Jackson, Mich.

Application August 29, 1932. Serial No. 630,830

14 Claims. (Cl. 279—119)

This invention relates particularly to improvements in lathe chucks of the fluid actuated or pneumatic type.

The main objects of this invention are:

First, to provide a chuck with equalized bearing clamps and crank arm jaws that will firmly chuck and center a crankshaft, or the like, without distortion or strain.

Second, to provide improved equalizing means for the clamps and jaws of a chuck of this character.

Objects relating to details and economies of my invention will apepar from the description to follow. A structure which is a preferred embodiment of my invention is illustrated in the accompanying drawing, in which.

Figure 1:
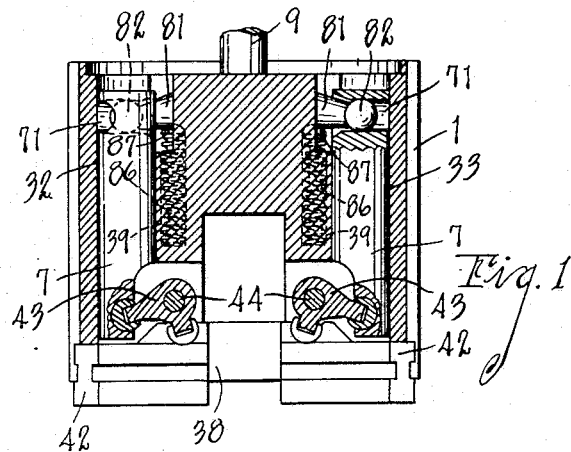
Fig. 1 is a horizontal section of the chuck on line 1—1 of Figs. 2 and 3.
Figure 2:
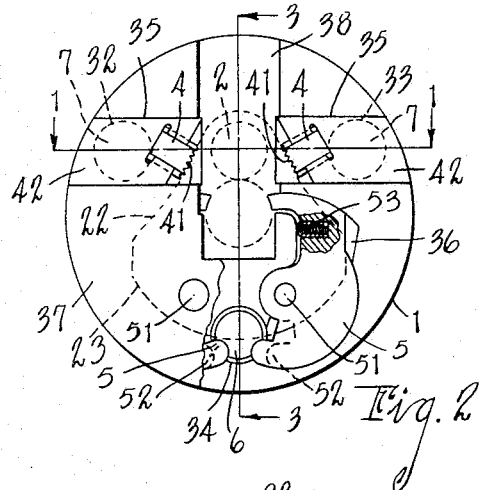
Fig. 2 is an end elevation, a portion of the cover plate being broken away and the crankshaft being shown in dotted lines.
Figure 3:
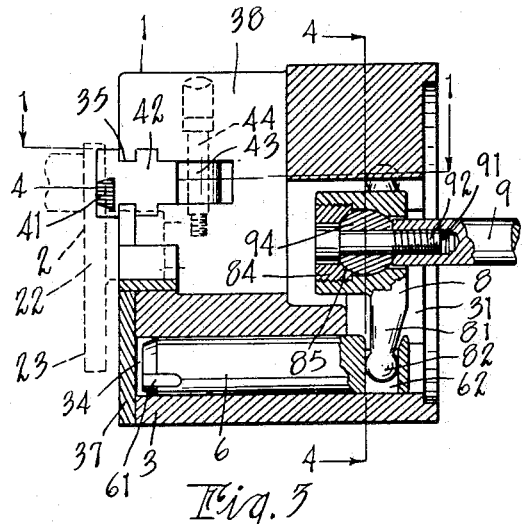
Fig. 3 is a vertical section on line 3—3 of Fig. 2.
Figure 4:
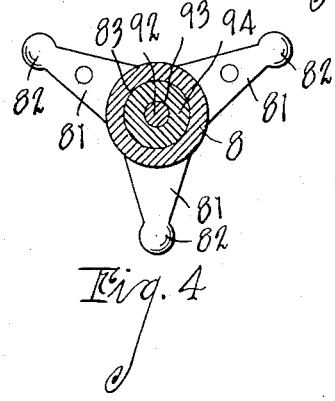
Fig. 4 is a transverse section on line 4—4 of Fig. 3, showing only the equalizing spider assembly.

The parts will be identified by their numerals of reference which are the same in all the views.

1 is a pneumatic chuck structure embodying my improvements and 2 is a crankshaft supported thereby. The chuck structure is adapted to be driven by a lathe (not shown).

3 is the chuck body which is provided with a central shouldered spider recess 31 in the spindle end, three longitudinal plunger bores 32, 33 and 34 arranged in symmetrical triangular relation about the axis of the body A transverse slide groove 35 is in the work end of the chuck body for the chuck jaws, crossing the bores 32 and 33 and recesses 36, 36 in the work end thereof for the pivoted jaws. The work end is provided with a cover plate 37, the body and plate having a transverse cradle opening 38 between the bores 32 and 33 for receiving and seating the crankshaft bearing 21.

4, 4 are a pair of downwardly inclined jaws having serrated surfaces 41, 41 for engaging the opposite sides of the crank arm 22 of the crankshaft 2. The arm 22 is flared and extends below the center of the crankshaft to provide a counterweight 23. The jaws 4, 4 are carried by the jaw slides 42, 42 which are slidably disposed in the said transverse slide groove 35 of the chuck body, the cover plate 37 forming one side of the groove.

5, 5 are a pair of pivoted crankshaft bearing jaws pivoted to the body 3 at 51, 51 in the clamp recesses 36, 36, the jaws being provided with cam followers 52, 52 projecting into the bore 34.

Each of the jaws 5 is provided with a spring actuated return plunger 53 engaging the wall of the recess 36 for returning or urging the jaw to its initial position clear of the cradle opening 38. With this arrangement, when the crankshaft is being placed in the chuck, the jaws 5, 5 are out of the way.

6 is a jaw operating plunger disposed in the bore 34 and having cam surface 61 in the form of a groove for actuating the pivoted jaws through their cam followers 52, 52 on the advance of the plunger.

7, 7 are a pair of jaw slide actuating plungers disposed in the bores 32 and 33, respectively, each plunger 7 being connected by means of a bell crank lever 43 to a jaw slide 42. The bell crank levers 43, 43 are pivoted to the body 3 at 44, 44. The parts are arranged so that when the plungers 7, 7 are advanced, the slides 42, 42 are moved toward each other so as to bring the jaws 4, 4 into engagement with the crank arm 22.

The jaw actuating plunger 6 and the slide actuating plungers 7, 7 are each provided with a transverse bearing socket 62 and 71, 71, respectively, near the spindle end thereof.

8 is a plunger actuating spider disposed in the recess 31 and having three radial arms 81 terminating in spheres 82 which are disposed in the transverse sockets of the plungers, there being an arm for each plunger. The bearing connection between the ends of the arms of the spider and the bearing sockets in the plungers is such that the sphere is free to swing, rotate, and slide in each socket to a limited extent, the joints being universal, so that the pressures transmitted from the spider to the plungers are automatically equalized.

9 is a control or push rod which is actuated by a piston (not shown) associated with the headstock of the lathe. The rod 9 is provided with a central bore 91 in which is threaded the screw bolt 92, the later passing through a central opening 93 in the ball 94 and securing the ball to the end of the rod 9. The hub of the spider 8 is provided with socket 83 for the ball 94, the latter being held in place in the socket by means of the nut 84, the latter being provided with a spherical ball seat 85. The ball and socket joint between the rod 9 and the spider 8 is a universal joint and permits the latter to equalize or adjust itself without distortion or strain.

Compression springs 86 coact with plungers 87, disposed in longitudinal bores 39 in the body 3, and urge the arms 81 of the spider to an initial or retracted position.

When the actuating force on the push rod 9 is released, the springs 86 and the spring actuated plungers 53 resiliently hold the jaws in an initial or retracted position. With the parts in this position, the crankshaft 2 is placed in the chuck with its bearing 21 in the cradle opening 38 and the counterweight 23 in the position shown in the drawing. The pneumatic means is then turned on, causing the push rod 9 to advance the spider 8, which in turn operates the jaw actuating plungers. This results in the pivoted jaws 5, 5 engaging the crankshaft journal 21 and the jaws 4, 4 engaging the crank arm 22 with the forces equalized by virtue of the floating spider 8. The arrangement is preferably such that the pivoted jaws 5, 5 engage the bearing 21 prior to the engagement of the sliding jaws 4, 4 with the sides of the crank arm. With the crankshaft thus engaged, it is centered and firmly chucked. To remove the crankshaft from the chuck, the pneumatic means is operated so as to release the push rod 9, the spring 86 thereupon retracting the spider and the plungers resulting in the retraction of the sliding jaws 4, 4 and the returning of the pivoted jaws 5, 5 to an initial position by the spring actuated plungers 53.

It is obvious that various changes and modifications may be made in the details of construction and design of the above specifically described embodiment of my invention without departing from the spirit thereof, such changes and modifications being restricted only by the scope of the following claims.

Having thus described my invention, what I claim as new and desire to secure by Letters Patent is:

1. In a pneumatic chuck structure, the combination of a chuck body having a central shouldered spider recess in the spindle end, three longitudinal plunger bores arranged in symmetrical triangular relation about the axis of the body, and a transverse jaw slideway in the work end crossing two of the bores and pivoted jaw recesses in the work end, a cover plate on the work end, said body and plate having a transverse cradle opening between said two bores for receiving and seating a crankshaft journal, a pair of jaw slides carried by said slideway, a crankshaft arm engaging jaw on each slide projecting beyond the face of said plate, a pair of pivoted crankshaft journal engaging jaws pivoted to said body in said recesses and having opposed cam followers projecting into the third bore, a pivoted jaw operating plunger in the third bore having cam surfaces coacting with said cam followers, spring means urging the pivoted jaws to initial position, a slide operating plunger in each of the first two bores, a bell crank lever pivoted to the body and connected to each slide and its plunger, said plungers having transverse bearing sockets near the spindle end, a plunger actuating spider in said spider recess and having three radial arms terminating in spheres in said sockets, a piston control rod connected to the hub of said spider by means of a universal ball and socket joint, and spring means urging the spider to retracted position.

2. In a chuck structure, the combination of a chuck body having a spider recess in the spindle end, three longitudinal plunger bores arranged in symmetrical triangular relation about the axis of the body, and a transverse jaw slideway in the work end crossing two of the bores, a cover plate on the work end, said body and plate having a transverse cradle opening between said two bores for receiving and seating a crankshaft journal, a pair of jaw slides carried by said slideway, a crankshaft arm engaging jaw on each slide projecting beyond the face of said plate, a pair of pivoted crankshaft journal engaging jaws pivoted to said body and having opposed cam followers projecting into the third bore, a pivoted jaw operating plunger in the third bore having cam surfaces coacting with said cam followers, spring means urging the pivoted jaws to initial position, a slide operating plunger in each of the first two bores, a bell crank lever pivoted to the body and connected to each slide and its plunger, said plungers having transverse bearing sockets near the spindle end, a plunger actuating spider in said spider recess and having three radial arms terminating in spheres in said sockets, a piston control rod connected to the hub of said spider by means of a universal joint, and spring means urging the spider to retracted position.

3. In a chuck structure, the combination of a chuck body having a spider recess in the spindle end, three longitudinal plunger bores arranged in symmetrical triangular relation about the axis of the body, and a transverse jaw slideway in the work end, a cover plate on the work end, said body and plate having a transverse cradle opening between said two bores for receiving and seating a crankshaft journal, a pair of jaw slides carried by said slideway, a crankshaft arm engaging jaw on each slide, a pair of pivoted crankshaft journal engaging jaws pivoted to said body and having opposed cam followers projecting into the third bore, a pivoted jaw operating plunger in the third bore having cam surfaces coacting with said cam followers, means urging the pivoted jaws to initial position, a slide operating plunger in each of the first two bores, a bell crank lever pivoted to the body and connected to each slide and its plunger, said plungers having transverse bearing sockets near the spindle end, a plunger actuating spider in said spider recess and having three radial arms terminating in spheres in said sockets, a control rod connected to the hub of said spider by means of a universal joint, and means urging the spider to a retracted position.

4. In a chuck structure, the combination of a chuck body having three longitudinal plunger bores arranged in symmetrical triangular relation about the axis of the body, a transverse jaw slideway in the work end crossing two of the bores, and pivoted jaw recesses in the work end, a cover plate on the work end, said body and plate having a transverse cradle opening between said two bores for receiving and seating a crankshaft journal, a pair of jaw slides carried by said slideway, a crankshaft arm engaging jaw on each slide, a pair of pivoted crankshaft journal engaging jaws pivoted to said body in said recesses and having opposed cam followers, a pivoted jaw operating plunger in the third bore having cam surfaces coacting with said cam followers, spring means urging the clamps to initial position, a slide operating plunger in each of the first two bores, said plungers having bearing sockets near the spindle end, a plunger actuating spider having three radial arms terminating in spheres in said sockets, a push rod connected to said spider by means of a universal ball and socket joint, and spring means urging the spider to retracted position.

5. In a chuck structure, the combination of a chuck body having three longitudinal plunger bores arranged in symmetrical triangular relation about the axis of the body, a transverse jaw slideway in the work end crossing two of the bores, and pivoted jaw recesses in the work end, a cover plate on the work end, said body and plate having a transverse cradle opening between said two bores for receiving and seating a crankshaft journal, a pair of jaw slides carried by said slideway, a crankshaft arm engaging jaw on each slide, a pair of pivoted crankshaft journal engaging jaws pivoted to said body in said recesses and having opposed cam followers, a pivoted jaw operating plunger in the third bore having cam surfaces coacting with said cam followers, a slide operating plunger in each of the first two bores, said plungers having bearing sockets near the spindle end, a plunger actuating spider having three radial arms terminating in spheres in said sockets, and a push rod connected to said spider by means of a universal joint.

6. In a pneumatic chuck structure, the combination of a chuck body having three longitudinal plunger bores arranged in triangular relation about the axis of the body, and a transverse slideway in the work end, said body having a transverse cradle opening between two of the bores for receiving and seating a crankshaft journal, a pair of jaw slides carried by said slideway, a crankshaft arm engaging jaw on each slide, a pair of crankshaft journal engaging jaws pivoted to said body, a pivoted jaw operating plunger in the third bore, spring means urging the pivoted jaws to initial position, a slide operating plunger in each of the first two bores, said plungers having bearing sockets near the spindle end, a plunger actuating spider in said spider recess and having three radial arms terminating in spheres in said sockets, a push rod connected to said spider by means of a central universal ball and socket joint, and spring means urging the spider to retracted position.

7. In a pneumatic chuck structure, the combination of a chuck body having three longitudinal plunger bores arranged in triangular relation about the axis of the body, and a transverse slideway in the work end, said body having a transverse cradle opening between two of the bores for receiving and seating a crankshaft journal, a pair of jaw slides carried by said slideway, a crankshaft arm engaging jaw on each slide, a pair of crankshaft journal engaging jaws pivoted to said body, a pivoted jaw operating plunger in the third bore, a slide operating plunger in each of the first two bores, said plungers having bearing sockets near the spindle end, a plunger actuating spider in said spider recess and having three radial arms terminating in spheres in said sockets, and a push rod connected to said spider by means of a central universal joint.

8. In a chuck structure, the combination of a chuck body having three longitudinal bores arranged in symmetrical triangular relation about the axis and having a transverse cradle opening for receiving and seating a crankshaft bearing, crankshaft journal engaging jaws pivoted to the body, a jaw operating plunger in one bore, crankshaft arm engaging jaws slidably carried by the body, a jaw operating plunger in each of the other bores, a plunger actuating spider having three radial arms, each of which is connected to its plunger by means of a ball and socket joint, a push rod connected to the hub of said spider by means of a universal ball and socket joint, and resilient means urging the parts to retracted position.

9. In a chuck structure, the combination of a chuck body having three longitudinal bores arranged in triangular relation about the axis and having a transverse cradle opening for receiving and seating a crankshaft bearing, crankshaft journal engaging jaws pivoted to the body, a jaw operating plunger in one bore, crankshaft arm engaging jaws slidably carried by the body, a jaw operating plunger in each of the other bores, a plunger actuating spider having three radial arms, each of which is connected to its plunger by means of a ball and socket joint, a push rod connected to the hub of said spider by means of a universal joint, and means urging the parts to retracted position.

10. In a chuck structure, the combination of a chuck body having three longitudinal bores arranged in triangular relation about the axis and having a transverse cradle opening for receiving and seating a crankshaft bearing, crankshaft journal engaging jaws, crankshaft arm engaging jaws, a jaw operating plunger in each of the bores, a plunger actuating spider having three radial arms, each of which is connected to its plunger by means of a ball and socket joint, a push rod connected to the hub of said spider by means of a universal joint, and means urging the parts to retracted position.

11. In a chuck structure, the combination of a chuck body having three longitudinal bores, a plunger in each bore having a transverse bearing socket, a spider having radial arms terminating in spheres, a sphere projecting into each socket, a push rod connected to the hub of said spider by means of a universal joint, and crankshaft arm and bearing engaging means controlled by said plunger.

12. In a chuck structure, the combination of a chuck body having three longitudinal bores, a plunger in each bore, chuck jaws actuated by said plungers, a spider having radial arms, each of which is journaled to one plunger for limited transverse swinging and rotary movement, and a push rod connected to the hub of said spider by means of a universal joint.

13. In a chuck structure, the combination of a chuck body having three longitudinal bores, a plunger in each bore, chuck jaws actuated by said plungers, a spider having radial arms, each of which is journaled to one plunger for limited transverse swinging and rotary movement, and means to reciprocate said spider.

14. In a chuck structure, the combination of a chuck body with a journal bearing seat and having a cradle opening for receiving and seating and centering a crankshaft journal, means for clamping the journal in place on said seat, jaws for engaging the crank arm, and equalizing means with an arm for actuating said journal clamping means, and equalizing arms engaging to actuate the jaws for the crank arm.

HAROLD A. TOMKINS.